United States Patent [19]

Ito

[11] Patent Number: 4,720,205

[45] Date of Patent: Jan. 19, 1988

[54] BALL JOINT

[75] Inventor: Eiichi Ito, Meerbusch, Fed. Rep. of Germany

[73] Assignee: TRW Ehrenreich GmbH & Co. KG, Dusseldorf, Fed. Rep. of Germany

[21] Appl. No.: 8,867

[22] Filed: Jan. 30, 1987

[30] Foreign Application Priority Data

Jan. 31, 1986 [DE] Fed. Rep. of Germany ....... 3602917

[51] Int. Cl.⁴ .............................................. F16C 11/06
[52] U.S. Cl. ..................................... 403/140; 403/135
[58] Field of Search ........................ 403/140, 138, 135

[56] References Cited

U.S. PATENT DOCUMENTS 3,063,744  11/1962  Flumerfelt .
3,210,105  10/1965  Vogt ..................................... 403/140
3,530,495   9/1970  Kindel ................................... 403/140

FOREIGN PATENT DOCUMENTS 6605346  1/1967  Fed. Rep. of Germany .
6606183  7/1968  Fed. Rep. of Germany .
1953116  10/1969  Fed. Rep. of Germany .
2326018  5/1973  Fed. Rep. of Germany .
2451084  10/1974  Fed. Rep. of Germany .
2441915  3/1976  Fed. Rep. of Germany ...... 403/138

Primary Examiner—Andrew V. Kundrat
Attorney, Agent, or Firm—Tarolli, Sundheim & Covell

[57] ABSTRACT

A ball joint includes a bearing which exerts a free play take up force against a ball stud. The bearing has trapezoidal-shaped spring arms connected therewith and disposed in a radial array. The free ends of the spring arms extend toward the longitudinal central axis of the ball stud. The free ends of the spring arms engage a housing cover and resiliently deflect to exert the free play take up force against the ball stud. The free ends of the spring arms are spaced from the ball stud.

8 Claims, 4 Drawing Figures

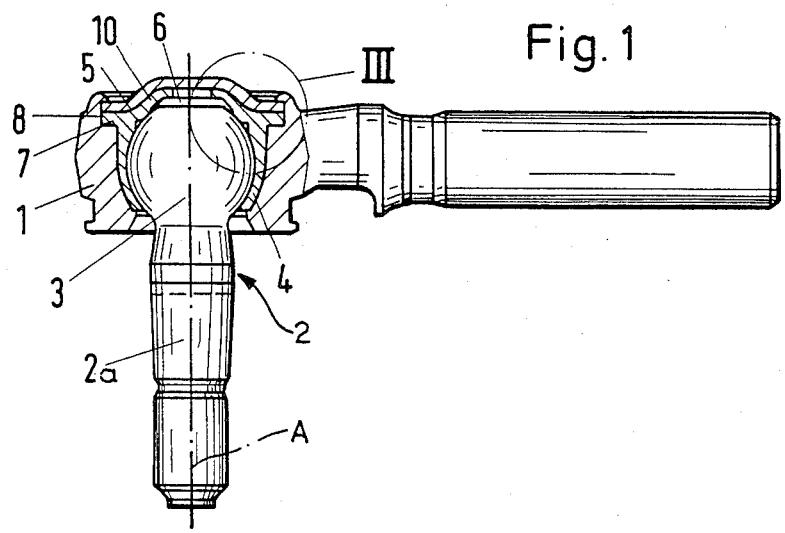
Fig. 1
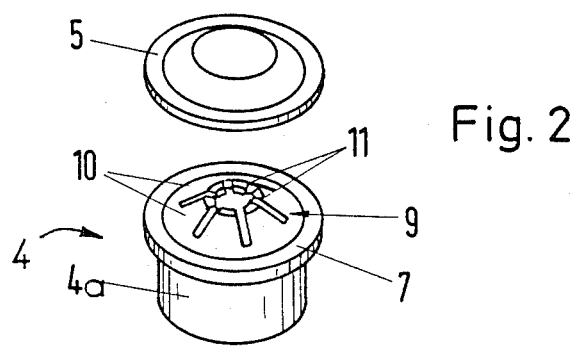
Fig. 2
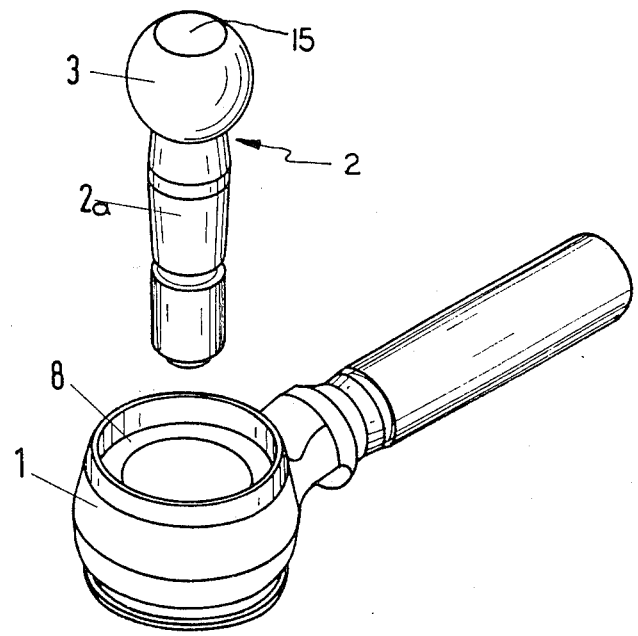

BALL JOINT

Background of the Invention

1. Field of the Invention

The present invention relates to a bearing for a ball joint. Particularly, the present invention relates to a bearing which takes up free play in the ball joint to compensate for wear and production tolerances of parts of the ball joint.

2. Description of the Prior Art

German Utility Model No. 74 30 451 discloses a ball joint having a bearing and a cover with spring arms connected to the cover. The spring arms extend radially outwardly from a central portion of the cover. Each of the spring arms have an arcuate surface for engaging a ball portion of a ball stud. The spring arms engage the ball portion at a location diametrically opposite from a stud portion of the ball stud. The spring arms exert a force against the ball portion of the ball stud to take up free play in the ball joint resulting from production tolerances or wear. The load encountered by the spring arms require that they have a relatively high spring rate. The force exerted by the spring arms on the ball portion of the ball stud may vary a relatively large amount as a result of production variations and wear of the parts of the ball joint.

If the ball portion of the ball stud has a spherical surface diametrically opposite to the stud portion, a portion of the spherical surface generally engages the housing cover. Thus, a relatively small space exists in which the spring arms can be disposed. If the ball portion of the ball stud has a planar surface disposed diametrically opposite to the stud portion and which extends perpendicular to the longitudinal central axis of the ball stud, there is more space between the housing cover and ball portion of the ball stud for the spring arms to be disposed However, during deflection of the ball stud from a neutral position, force variations and uneven force distribution are often applied by the spring arms because not all of the spring arms engage the ball stud. Another disadvantage to such spring arms is that the spring arms may be relatively weak because they are connected with the housing cover at the narrowest cross section of each spring arm. Furthermore, the spring arms are often subjected to high loads, especially when loads are applied to the ball stud along the longitudinal central axis of the ball stud.

German Pat. No. 1,826,870 discloses a ball joint in which a ball portion of the ball stud is supported by a separate spring which engages a housing or housing cover of the ball joint. The spring includes a rigid central part which engages a ball portion of a ball stud. Spring arms extend radially outwardly from the central portion. After the ball joint is assembled, the free ends of the spring arms extend away from the longitudinal central axis of the ball stud to engage the housing cover or the housing. A disadvantage to such a structure is that the spring arms may deflect only a relatively small distance. Thus, production variations and wear of the parts of the ball joint limit the amount of free play that can be taken up.

If the ball portion of the ball stud has a planar surface disposed diametrically opposite a stud portion of the ball stud, which planar surface also extends perpendicular to the longitudinal central axis of the ball stud, the spring is supported directly against the planar surface. Thus, the free play take up force exerted against the ball portion may vary greatly during deflection of the ball stud. Such a spring also has the disadvantages that it is usually relatively large which requires additional space within the ball joint, that the spring may rotate within the ball joint, and that loads applied along the longitudinal central axis of the ball stud are fully transmitted to the spring.

SUMMARY OF THE INVENTION

The present invention is directed to a ball joint bearing for taking up free play in a ball joint. The bearing includes a plurality of spring arms extending radially inwardly from an end surface of the bearing and toward the longitudinal central axis of the bearing. The free ends of the spring arms are spaced from a ball portion of the ball stud and engage a housing cover to exert a free play take up force against a ball stud.

According to the present invention, the ball joint includes a housing with a cavity therein and a ball stud having a ball portion and a stud portion. The ball portion is disposed within the cavity of the housing and the stud portion extends through an opening in the housing. The bearing is disposed between the cavity of the housing and the ball portion of the ball stud. Spring arms are connected with an end portion of the bearing. A housing cover closes another opening in the housing and engages the spring arms. Free ends of the spring arms extend radially inwardly toward the longitudinal central axis of the ball stud. The spring arms also engage the ball portion of the ball stud. The housing cover exerts a force on the free ends of the spring arms to elastically deform the spring arms which, in turn, exert a force on the ball portion of the ball stud to take up free play in the ball joint. The free ends of the spring arms are spaced away from the ball portion and therefore may deflect a relatively large distance.

A relatively constant and relatively small free play take up force is exerted against the ball portion. The spring arms are relatively long and, thus, may take up a relatively large amount of free play in the ball joint due to production variations or wear of the ball joint. Thus, ball joints made in accordance with the present invention can be produced and operated with relatively constant free play take up characteristics.

Each of the spring arms have a protrusion extending therefrom adjacent to the location at which the spring arms are attached to the bearing. The protrusions space the spring arms slightly from the ball portion and engage the ball portion with a relatively small contact area. Each of the spring arms are of a trapezoidal configuration. The base portion of the trapezoidal spring arm is connected with the bearing so that the greatest cross section of the spring arm forms the connection. The bearing includes a surface which supports the ball portion of the ball stud on either side of an equatorial plane of the ball portion which extends perpendicular to the longitudinal axis of the ball stud. Thus, loads applied along the longitudinal central axis of the ball stud are transmitted through the support surfaces of the bearing and not the spring arms.

BRIEF DESCRIPTION OF THE DRAWINGS

Further features of the present invention will become apparent to those skilled in the art to which the present invention relates from a reading of the following specification made with reference to the accompanying drawings, in which:

FIG. 1 is a side elevation, partly in section, of a ball joint including a bearing embodying the present invention;

FIG. 2 is an exploded perspective view of the ball joint of FIG. 1;

DESCRIPTION OF A PREFERRED EMBODIMENT

Figure 3:
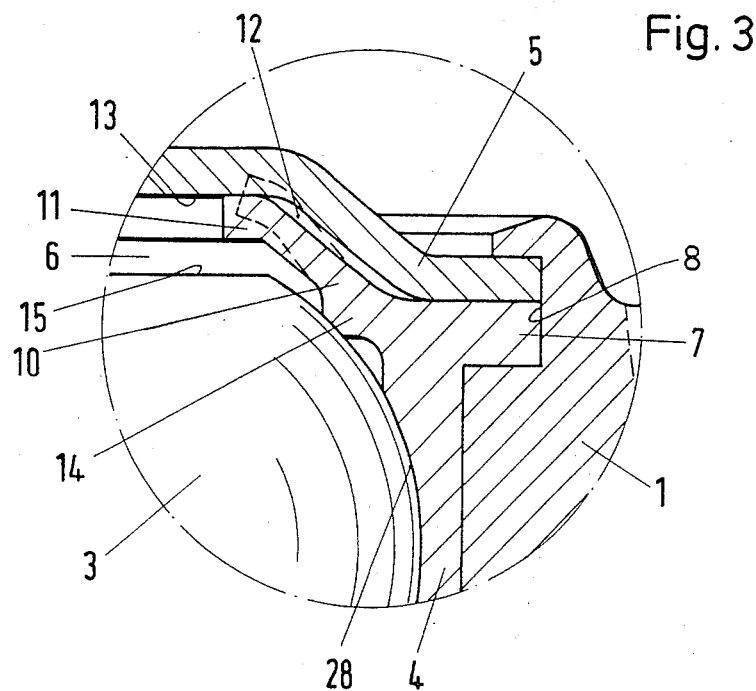
FIG. 3 is an enlarged view of a portion of the ball joint of FIG. 1.

A ball joint including a bearing embodying the present invention is illustrated in FIG. 1. While the ball joint is illustrated as being part of an automotive tie rod assembly, the illustration is for exemplary purposes only and not intended to limit the application of the present invention. It will be apparent that the ball joint may be used in other applications where force or motion transmission between members is required.

The ball joint illustrated in FIG. 1 includes a housing 1 and a ball stud 2. The ball stud 2 includes a stud portion 2a and a ball portion 3. The ball portion 3 of the ball stud 2 is disposed within a cavity of the housing 1. The stud portion 2a of the ball stud 2 extends through an opening in the housing. The ball stud 2 has a longitudinal central axis A. A bearing 4 is disposed between the housing 1 and the ball portion 3 of the ball stud 2. The bearing 4 includes a body 4a with an outer surface of a cylindrical configuration which is deformable during assembly of the ball joint.

The bearing 4 includes a flange 7 which extends radially outwardly from the body 4a near an end portion 9 of the bearing. The flange 7 of the bearing 4 is supported in a stepped opening 8 of the housing 1. The housing 1 is closed by a housing cover 5. The housing cover 5 and bearing 4 are retained in the housing 1 by rolling over an edge portion of the housing adjacent the stepped opening 8 to engage the housing cover. The housing cover 5 is preferably made from stamped steel and defines a grease reservoir 6 between the ball portion 3 of the ball stud 2 and the housing cover.

The bearing 4 (FIG. 2) includes six resiliently deflectable spring arms 10. Each of the spring arms 10 have parallel major side surfaces of a trapezoidal configuration. The bases of the trapezoids 10 are connected with the end portion 9 of the body 4a. Thus, the greatest cross section of the trapezoidal spring arms 10 are connected with the bearing 4. A free end 11 of each of the spring arms 10 extends radially inwardly towards the longitudinal central axis of the bearing 4 and the longitudinal central axis A of the ball stud 2. The bearing 4 is preferably made of a relatively hard plastic, such as polyoxymethylene (POM). The spring arms 10 are preferably formed as one piece with the bearing 4.

The spring arms 10 are disposed at an acute angle relative to the longitudinal central axis A of the ball stud 2. The spring arms 10 enclose the ball portion 3 at a location which is diametrically opposite the stud portion 2a. As illustrated in FIG. 3, the spring arms 10 are resiliently deformable from their free state position, which is shown in dashed lines. The spring arms 10 are disposed in the hollow space 12 between the housing cover 5 and the ball portion 3. A support surface 13 of the housing cover engages the free ends 11 of the spring arms 10. The free ends 10 deflect to extend parallel with the support surface 13.

The resilient deformation of the spring arms 10 exerts a free play take up force against the ball portion 3 of the ball stud through protrusions 14. The protrusions 14 extend inwardly of the bearing 4 to engage the ball portion 3 over a relatively small contact area. Since a respective protrusion 14 extends from each spring arm 10, the free play take up force is evenly distributed around the ball portion 3. The protrusions 14 space the spring arms 10 away from engaging the ball portion 3 of the ball stud 2. Thus, the effective spring length, defined by the location of contact between the spring arm 10 and the housing cover 5 and between a protrusion 14 of the spring arm 10 and the ball portion 3, remains a relatively constant length throughout the service life of the ball joint. Thus, a relatively constant free play take up force is applied against the ball portion 3 throughout the service life of the ball joint. A further advantage is that the free play take up force is relatively insensitive to production tolerances of the components of the ball joint.

A planar surface 15 of the ball stud 2 is located diametrically opposite of the stud portion 2a and extends perpendicular to the longitudinal central axis A. The use of such a planar surface 15 allows for an increased volume for the grease reservoir 6 as compared to a spherical ball portion. The protrusions 14 of the spring arms 10 are disposed so that they are located outside of a zone in which the planar surface 15 may traverse during deflection of the ball stud 2. Thus, a relatively constant free play take up force is maintained against the ball portion 3 during deflection of the ball stud 2 from a neutral position.

The bearing 4 has a support surface 28 which supports the ball portion 3 of the ball stud on both sides of an equatorial plane extending perpendicular to the longitudinal central axis A of the ball stud. Thus, any loads transmitted along the longitudinal central axis A are transmitted through the bearing 4 to the housing 1, and not against the spring arms 10. Thus, the spring arms 10 exert a relatively small free play take up force against the ball portion 3, because the spring arms do not have to bear all of the loads transmitted through the ball joint. Ball joints constructed in accordance with the present invention also have the advantage that the free play take up force will be relatively constant among all of the ball joints produced. This results because the free play take up force is not dependent upon the production tolerances of the parts of the ball joint. The free play take up force is determined almost entirely by the spring arms 10.

Figure 4:
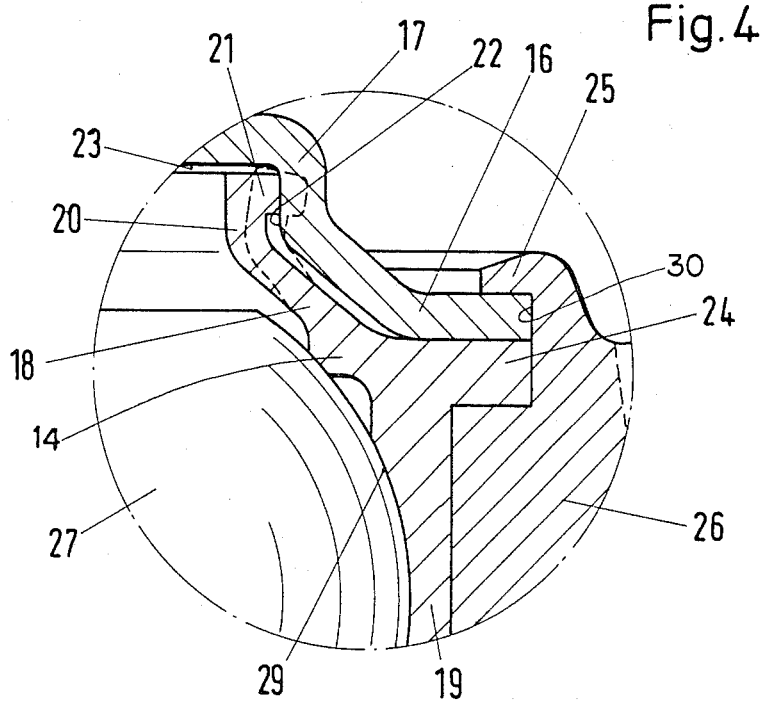
FIG. 4 is a view similar to that of FIG. 3 illustrating an alternate embodiment.

An alternate embodiment of the present invention is illustrated in FIG. 4. A housing cover 16 includes a cup-like projection 17 extending outwardly from the ball joint. The cup-like projection 17 has a central axis extending coaxially with a longitudinal central axis of a bearing 19. The cup-like projection 17 has a cylindrical inner wall 22. Spring arms 18 of the bearing 19 have free end portions 20 which extend upwardly as viewed in FIG. 4. Protrusions 21 extend radially outward from the spring arms 18 and engage the cylindrical inner wall 22 of the cup-like projection 17. Free end portions 20 of the spring arms 18 are spaced from the cup-like projection 17 by a gap 23. The bearing 19 is inserted into an opening 30 in the housing 26 with the cover 16. The portion 25 of the housing 26 adjacent the opening 30 is deformed or rolled over to retain the bearing 19 and cover 16. The free play take up force exerted by the spring arms 18 against the ball portion 27 is relatively constant between ball joints made in accordance with this alternate embodiment.

The bearing 19 supports the ball portion 27 by a support surface 29 on both sides of an equatorial plane extending perpendicular to the longitudinal central axis of the ball stud. This prevents both axial and radial operating loads from being transmitted to the springs arms 18.

From the above description of a preferred embodiment of the invention, those skilled in the art will perceive improvements, changes and modifications. Such improvements, changes and modifications within the skill of the art are intended to be covered by the appended claims.

Having described a preferred embodiment of the invention, I claim:

1. A ball jount comprising:
   a housing having a cover;
   a ball stud having a ball portion disposed in the housing; and
   a bearing disposed between the housing and the ball portion and having an end portion and spring arms;
   the spring arms being disposed in a radial array, engaging the ball portion at one end and then extending spaced therefrom in a direction away from the ball portion;
   each of the spring arms having one end thereof connected to the end portion of the bearing and the other end thereof extending toward the longitudinal central axis of the ball stud, said other end being spaced from the ball portion and engaging the cover to thereby exert a force against the ball portion;
   the housing cover having a cup-like projection extending outwardly from the ball jount, the other ends of the spring arms engaging a cylindrical inner surface of said cup-like projection.

2. A ball joint comprising:
   a housing having a cover;
   a ball stud having a ball portion disposed in the housing; and
   a bearing disposed between the housing and the ball portion and having an end portion and spring arms;
   the spring arms being disposed in a radial array, engaging the ball portion and extending in a direction away from the ball portion;
   each of the spring arms having one end thereof connected to the end portion of the bearing and the other end thereof extending toward the longitudinal central axis of the ball stud, said other end being spaced from the ball portion and engaging the cover to thereby exert a force against the ball portion; and
   each of the spring arms including a protrusion extending therefrom for engaging the ball portion of the ball stud to space the spring arm from the ball portion.

3. A ball joint according to claim 2 wherein the ball portion has a planar surface diaametrically opposite the stud portion of the ball stud extending transverse to the longitudinal central axis, the spring arms engaging the ball portion at a location other than the planar surface.

4. A ball joint according to claim 2 wherein each of the spring arms has a trapezoidal configuration with a base portion connected with the bearing.

5. A ball joint according to claim 2 wherein the housing cover has a cup-like projection extending outwardly from the ball joint, the free ends of the spring arms engage a cylindrical inner surface of said cup-like projection.

6. A ball joint according to claim 2 wherein the other ends of the spring arms extend parallel to a support surface of the housing cover.

7. A ball joint according to claim 2 wherein a bearing surface of the bearing engages the ball portion of the ball stud on both sides of an equatorial plane extending perpendicular to the longitudinal central axis of the ball stud.

8. A ball joint according to claim 2 wherein the bearing and spring arms are formed as one piece.

* * * * *